US009227149B2

(12) United States Patent
Boudeman

(10) Patent No.: US 9,227,149 B2
(45) Date of Patent: *Jan. 5, 2016

(54) CONDENSED VAPOR COLLECTION SYSTEM AND METHOD

(71) Applicant: SSPP LLC, Las Vegas, NV (US)

(72) Inventor: Joseph W. Boudeman, Pacifica, CA (US)

(73) Assignee: SSPP, LLC, Las Vegas, NV (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/209,936

(22) Filed: Mar. 13, 2014

(65) Prior Publication Data

US 2014/0311887 A1 Oct. 23, 2014

Related U.S. Application Data

(60) Provisional application No. 61/783,831, filed on Mar. 14, 2013.

(51) Int. Cl.
*B01D 5/00* (2006.01)
*C02F 1/18* (2006.01)
*B01D 53/26* (2006.01)
*C02F 1/14* (2006.01)
*E03B 3/28* (2006.01)

(52) U.S. Cl.
CPC .............. *B01D 5/0015* (2013.01); *B01D 5/009* (2013.01); *B01D 53/265* (2013.01); *C02F 1/14* (2013.01); *C02F 1/18* (2013.01); *E03B 3/28* (2013.01)

(58) Field of Classification Search
CPC ..... B01D 5/0015; B01D 5/009; B01D 53/265; C02F 1/14; C02F 1/18; E03B 3/28
See application file for complete search history.

(56) References Cited

U.S. PATENT DOCUMENTS

| 2,405,877 | A | * | 8/1946 | Delano | 202/234 |
| 3,397,117 | A | * | 8/1968 | Smith et al. | 202/234 |
| 4,141,798 | A | * | 2/1979 | Grosse | 202/234 |
| 4,433,552 | A | * | 2/1984 | Smith | 62/93 |
| 5,158,650 | A | * | 10/1992 | Wilkerson | 202/234 |
| 5,533,303 | A | | 7/1996 | Harvey | |
| 5,601,236 | A | * | 2/1997 | Wold | 239/63 |
| 5,846,296 | A | * | 12/1998 | Krumsvik | 95/115 |
| 6,116,034 | A | | 9/2000 | Alexeev | |
| 6,574,979 | B2 | * | 6/2003 | Faqih | 62/285 |
| 6,684,648 | B2 | * | 2/2004 | Faqih | 62/93 |
| 7,328,584 | B2 | * | 2/2008 | Craven | 62/93 |
| 7,467,523 | B2 | * | 12/2008 | Vetrovec et al. | 62/272 |
| 8,321,061 | B2 | * | 11/2012 | Anderson | 700/284 |
| 2005/0103615 | A1 | * | 5/2005 | Ritchey | 203/10 |
| 2008/0314058 | A1 | * | 12/2008 | Jones et al. | 62/235.1 |
| 2009/0241580 | A1 | * | 10/2009 | Hill et al. | 62/291 |

FOREIGN PATENT DOCUMENTS

DE 3633389 4/1988
RU 2256036 7/2005

* cited by examiner

*Primary Examiner* — In Suk Bullock
*Assistant Examiner* — Jonathan Miller
(74) *Attorney, Agent, or Firm* — West & Associates, A PC; Stuart J. West; Shaun N. Sluman

(57) ABSTRACT

An apparatus for collecting atmospheric and soil vapor condensate and transferring said condensate to a storage vessel for use in farming or other applications.

18 Claims, 8 Drawing Sheets

CONDENSED VAPOR COLLECTION SYSTEM AND METHOD

CLAIM OF PRIORITY

The following application claims priority to U.S. Provisional Patent Application No. 61/783,831, filed Mar. 14, 2013, the complete contents of which are hereby incorporated by reference.

BACKGROUND

Technical Field

The present device relates to the field of "green technology," particularly vapor and energy recovery systems for conservation.

Recovery of liquid vapor is commonly used in such devices as stills. In these devices, a collection surface is provided upon which vaporized liquid can condense. The liquid is then channeled to a storage container, thereby allowing for use of condensate in desired applications without the need to source water in other more difficult and/or costly ways. Development of devices and methods for capturing energy is an emerging field. In these devices, energy is collected that would ordinarily go unused/uncollected and is channeled for storage and/or use.

In many regions, water conservation is critical to the environment and usable energy is needed. Collecting ambient water vapor can provide an additional source of water. In commercial agricultural settings, this could be used for watering crops and other uses. Collectively, several collection units in fields could contribute to significant water savings and energy generation in a farming operation. What is needed is a simple and convenient vapor and/or energy collection device for use in agricultural settings or in resource management.

SUMMARY

The present device collects condensation from water vapor in the air. Vapor can condense on a substantially planar component and then be channeled down to a collection vessel via collection members, flexible tubing, and/or a support member. Energy capturing and storage elements can be attached or manufactured to be part of the device.

BRIEF DESCRIPTION OF THE DRAWINGS

Further details of the present device are explained with the help of the attached drawings in which.

DETAILED DESCRIPTION

Figure 1A:
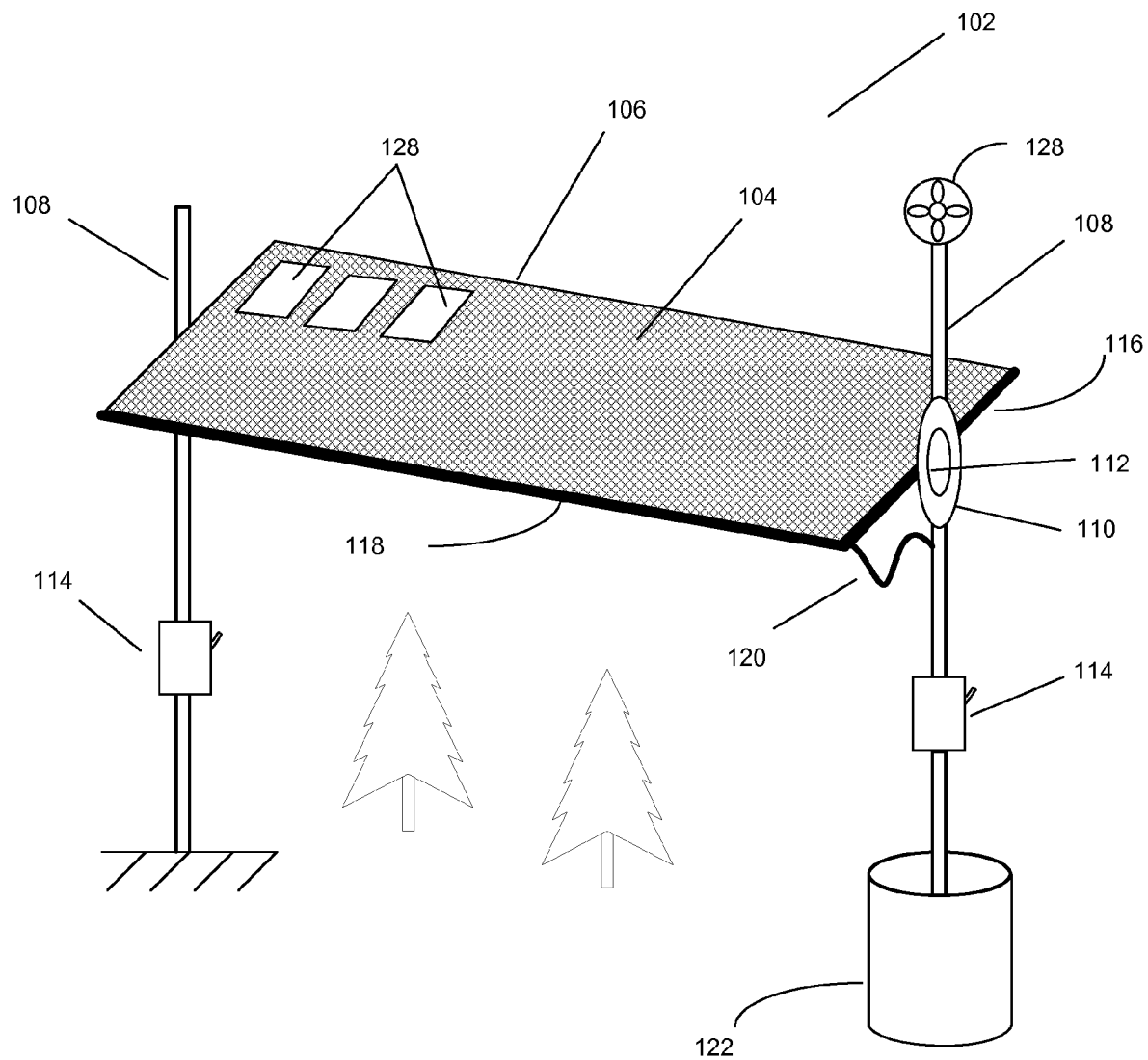
FIG. 1A depicts a perspective view of the present device in use in an open field or other area.

As depicted in FIG. 1A, a vapor condensate collection apparatus 102 can comprise at least one substantially planar member 104 that, in some embodiments, can be attached to at least one frame member 106. However, in other embodiments, a collection apparatus 102 can be a singular frame 106 or collection of substantially rigid frames. In some embodiments, a substantially planar member 104 can have a rectangular geometry, while in other embodiments a substantially planar member 104 can be circular, ovoid, triangular, hexagonal, or can have any other known and/or convenient geometry.

A substantially planar member 104 can be fabricated from nylon, polymer, metal, mesh, fabric, silicone or any other known and/or convenient material. In some embodiments, the material comprising a substantially planar member 104 can have properties that can allow water to freely slide under the influence of gravity, yet still maintain sufficient surface tension to remain in contact with the surface of the substantially planar member 104. In additional embodiments, a substantially planar member 104 can be comprised of material to attract moisture from the atmosphere surrounding a collection apparatus 102. In some embodiments, a substantially planar member 104 can be comprised of flexible material, allowing it to be selectively manipulated into desired geometries to account for changes in sun position, wind, and weather. In other embodiments it can be comprised of semi-rigid material or any other desired type of material. A substantially planar member 104 can also be utilized as a ground cover in place of mulch or other coverings to prevent soil moisture loss and/or prevent harmful effects from freezing temperatures. Moreover, a substantially planar member 104 can have a series of ridges, depressions, and/or channels that can aid in transfer of accumulated moisture to a desired location.

At least one frame member 106 can be comprised of rigid and/or semi-rigid material, such as, but not limited to, nylon, polymer, metal, silicone, wood or treated wood. Moreover, in some embodiments a frame member 106 can be comprised of corrosive-resistant, anti-mold, and/or anti-fungal material, and/or can be adapted to withstand extremely high or low temperatures without excessive wear, breakage, or warping. A frame member 106 can be fabricated, as shown in FIG. 1A, as multiple components that can be connected with screws, pins, clips, friction-fit, or any other known and convenient type of fastener. In other embodiments, a substantially rigid frame 106 can be fabricated as a continuous member. In yet alternate embodiments, a frame member 106 can have one or more joints allowing for selective manipulation of a frame member 106 and/or a substantially planar member 104 into desired geometric configurations. In certain embodiments, a substantially planar member 104 and/or a frame member 106 can have spikes or other sharp protrusions extending from their upper surfaces to deter birds or other wildlife from using the collection apparatus 102 as a perch or nesting location. In other embodiments, a collection apparatus 102 can have any other desired components or properties to deter intrusion from unwanted animals or organisms.

As shown in FIG. 1A, in some embodiments, a substantially planar member 104 can have a first lateral edge proximate to its proximal end, and a second lateral edge proximate to its distal end. Each end of a substantially planar member 104 can be coupled with at least one elongated support member 108 proximate to the distal end of said elongated support member 108. In other embodiments, a substantially planar member 104 can be coupled with one or more elongated support members 108 in any other desired manner or configuration. In the embodiment depicted, an apparatus 102 comprises two elongated support members 108 separated by a distance, each having a substantially vertical configuration. In other embodiments, an apparatus 102 can have any other desired number of support members 108 and they can be in any desired configuration. Moreover, support members 108 can be coupled with a substantially planar member 104 via a pivot mechanism 110 located substantially at the ends of the centermost longitudinal axis of the substantially planar member 104. In some embodiments, a pivot mechanism 110 can comprise a pivot motor 112 that can enable rotation of the substantially planar member 104 and/or frame member 108 about its longitudinal axis.

Figure 1B:
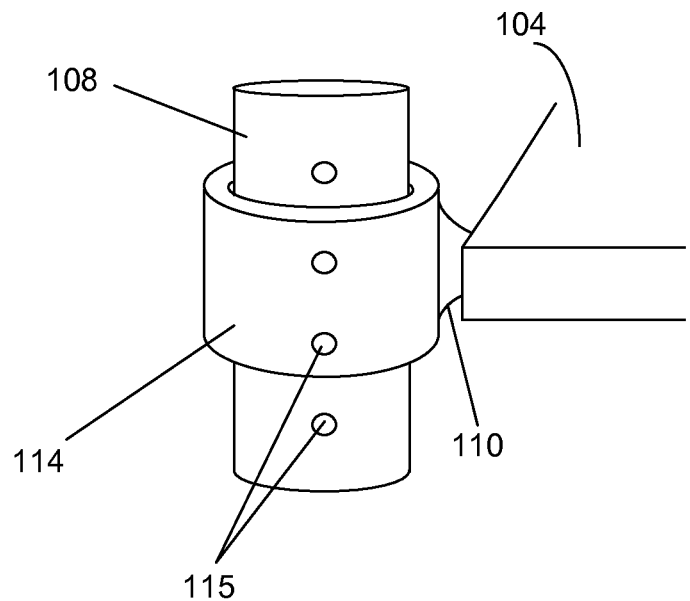
FIG. 1B depicts a perspective view of a control mechanism system.

As shown in FIG. 1A, a control mechanism 114 can allow for height adjustment of a substantially planar member 104 and/or an elongated support member 108. In some embodiments, an elongated support member 108 can increase or decrease in height via telescoping or any other desired mechanism (which can be controlled via a control mechanism 114), while in other embodiments an elongated support member 108 can remain stationary while a substantially planar member 104 can be vertically adjusted (via a control mechanism 114) relative to an elongated support member 108 and/or the ground. A control mechanism 114 can be a motor, pulley system, or any other mechanism for manual and/or automated adjustment of the height of an elongated support member 108. In some embodiments, a substantially planar member 104 can be coupled directly to an elongated support member 108. In other embodiments, a substantially planar member 104 can be coupled with an elongated support member 108 via a control mechanism 114, as depicted in FIG. 1B. Moreover, in the embodiment shown in FIG. 1B, a control mechanism 114 can be a tubular device that can accept an elongated support member 108, such that the control mechanism 114 can slide along the length of the elongated support member 108. In some embodiments, a control mechanism 114 can further comprise a locking mechanism 115 to selectively hold a substantially planar member 104 in a desired position. In the embodiment shown in FIG. 1B, a locking mechanism 115 comprises apertures in the control mechanism 114 and complementary pins along the length of a substantially planar member 104. In other embodiments, a locking mechanism 115 can comprise brackets, straps, clamps, or any other known and/or convenient device.

Figure 1C:
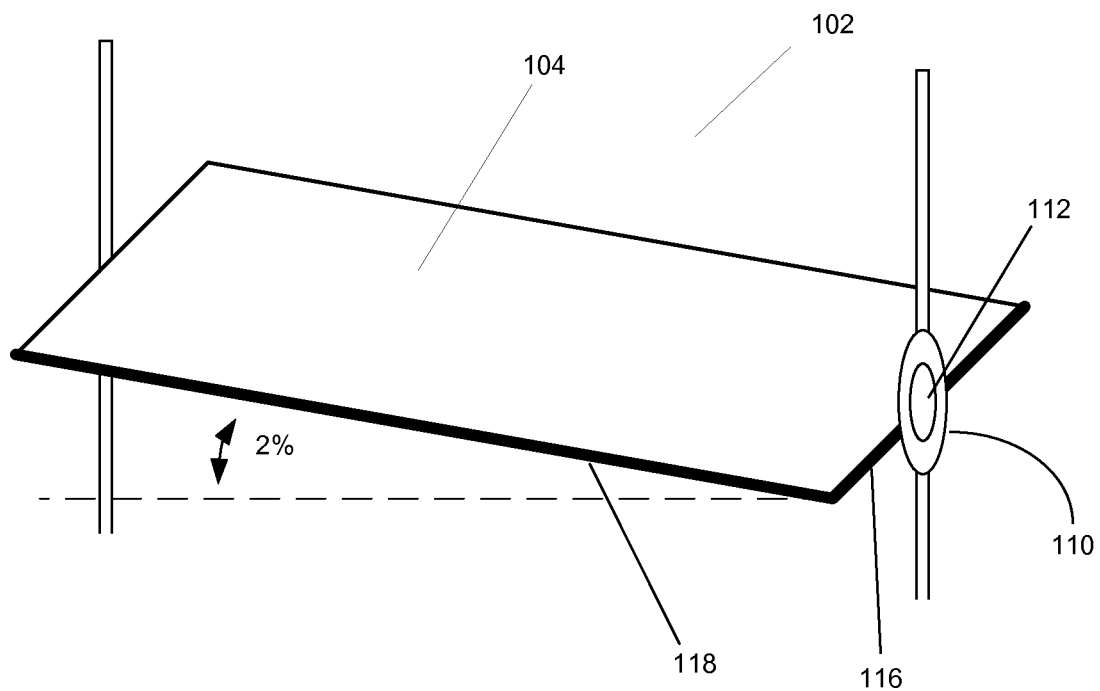
FIG. 1C depicts a side planar view of the present device to illustrate the grade of inclination of the substantially planar member.

Referring to FIG. 1C, the height of a first elongated support member 108 can be increased to be slightly greater than that of a second elongated support member 108. As a result, the longitudinal axis of a substantially planar member 104 can be slightly inclined relative to the plane perpendicular to an elongated support member 108. As shown in FIG. 1C, the longitudinal axis of a collection surface can form a gradient of approximately 2% relative to the plane perpendicular to an elongated support member 108, but in other embodiments can have any other known and/or convenient gradient. A gradient can allow accumulated water to travel in a desired direction on a substantially planar member 104, a first collection device 116, and/or a second collection device 118. In alternate embodiments, any other known, convenient and/or desired configuration can be implemented to allow collected water vapor to be selectively directed to any desired location. Moreover, the ability to tilt a substantially planar member 104 can allow for selective manipulation of the positioning of a collection apparatus 102 to shade vegetation from sun, shield from weather, maximize solar energy capture (described below), or for any other desired purpose.

An elongated support member 108 can be fabricated from metal, polymer, wood or any other known and/or convenient material. In some embodiments, an elongated support member 108 can have corrosion-resistant, anti-mold, anti-fungal, and/or ultraviolet-protective properties and/or coatings. In yet further embodiments, the material comprising an elongated support member 108 can be adapted to withstand extremely high or low temperatures without excessive wear, breakage, or warping. In the embodiments depicted in FIGS. 1A-1C, elongated support members 108 have substantially cylindrical geometry and a substantially circular lateral cross-sectional geometry. In other embodiments, elongated support members 108 can have any other desired geometries and/or configurations. In the embodiment depicted in FIG. 1A, an elongated support member 108 can have be tubular and can have a hollow interior that can act as a passageway for accumulated water to travel between a substantially planar member 104, a first collection device 116, a second collection device 118, a flexible tube 120, and/or a storage vessel 122.

A substantially planar member 104, an elongated support member 108, and/or a pivot mechanism 110 can be coupled via screws, pins, clips, brackets, friction fit, adhesive, thermal bonding, and/or any other known and/or convenient method of coupling. While the embodiment shown in FIG. 1A depicts a pivot mechanism 110 located proximate to the centermost points along the lateral edges of a substantially planar member 104, in other embodiments a pivot mechanism 110 can be coupled with one or more longitudinal edges of a substantially planar member 104. In yet further embodiments, a substantially planar member 104 and a pivot mechanism 110 can be coupled in any other desired location or manner.

A pivot mechanism 110 can comprise a pulley system, drive axle or dead axle, or any other component desired or necessary for operation. Moreover, a pivot mechanism 110 can comprise a brake mechanism for manual or electronic braking of a rotating substantially planar member 104, and/or a locking mechanism to hold a substantially planar member 104 in a desired position. A pivot mechanism 110 can comprise nuts, screw, bolts, or any other desired part, and can be comprised of metal, wood, plastic, polymer, and/or any other known and/or convenient material or combination of materials. In some embodiments, a pivot mechanism 110 can be manual, such as but not limited to a hand crank mechanism, but in other embodiments a pivot mechanism 110 can be driven at least in part by a pivot motor 112. A pivot motor 112 can be powered by an attached electrical supply, battery, solar power, wind generated energy, and/or any other known and/or convenient energy source.

Figure 1D:
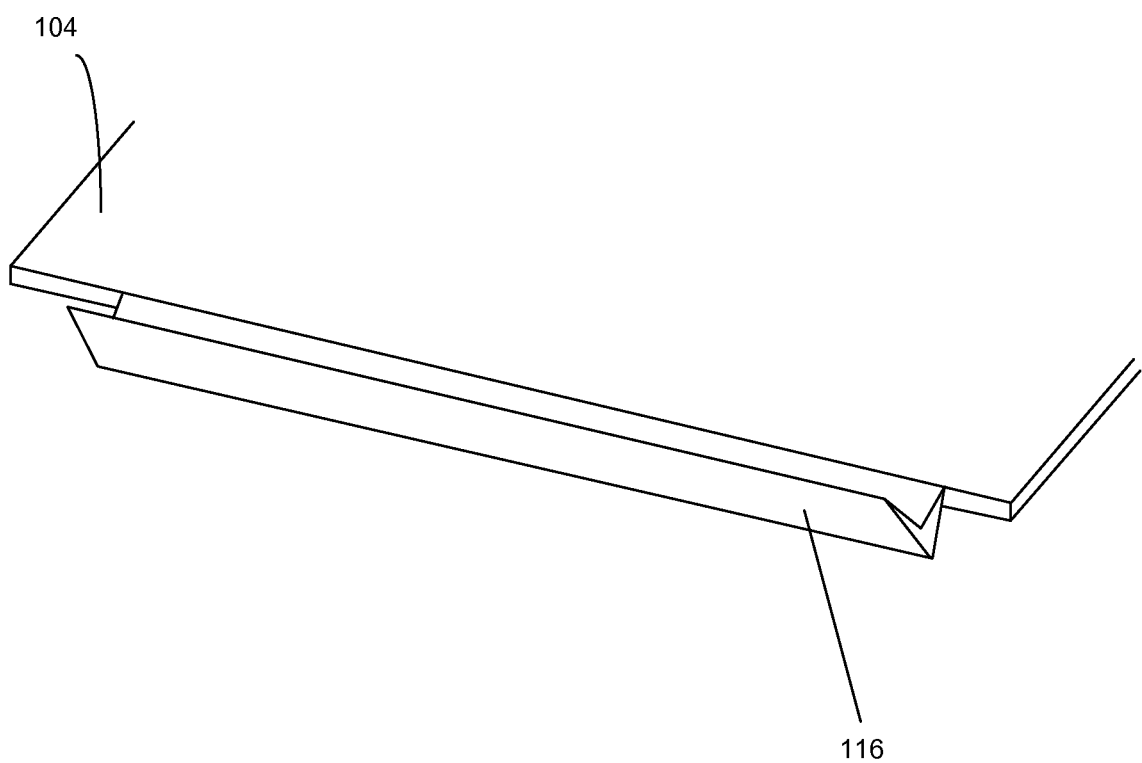
FIG. 1D depicts a perspective view of a first collection device coupled with a substantially planar member.

As shown in FIG. 1A, a first collection device 116 can be an elongated member and can extend substantially along and be coupled with the edge of one lateral end of a substantially planar member 104. In other embodiments, a first collection device 116 can be integrated into the edge of a collection apparatus 102 or can be part of a frame member 106. In further embodiments, a first collection device 116 can be coupled with only select portions of an edge of a substantially planar member 104, such that it can hang freely from a substantially planar member 104 in some areas. Referring to FIG. 1D, in some embodiments a first collection device 116 can have an "open-top" trough configuration, with said "open top" adjacent to the edge of a lateral end of a substantially planar member 104. In such embodiments a first collection device 116 can have a substantially V-shaped lateral cross-sectional geometry. However, in other embodiments, a first collection device 116 can have a rounded, rectangular, U-shaped, or any other known and/or convenient geometry, with any desired cross-sectional geometry. In yet further embodiments, a first collection device 116 can have one or more apertures along its length such that accumulated water can be funneled down onto the ground or into a tube, container, or any other desired device. A first collection device 116 can be fabricated from metal, plastic, treated wood, or any other known and/or convenient material upon which water can freely slide under the influence of gravity. Moreover, the material comprising a first collection device 116 can have corrosion-resistant, anti-mold, anti-bacterial, and/or ultraviolet-protective properties and/or coatings. In yet further embodiments, the material comprising a first collection device 116 can be adapted to withstand extremely high or low temperatures without excessive wear, breakage, or warping.

As shown in FIG. 1A, a collection apparatus 102 can be rotated about its longitudinal axis such that one longitudinal edge is lower than the other. In such embodiments, a second collection device 118 can extend substantially along and be coupled with the lower longitudinal edge of a substantially planar member 104. In other embodiments, a second collection device 118 can be integrated into a longitudinal edge of a substantially planar member 104 or can be part of a frame member 106 adjacent to the edge of the lower longitudinal edge of a flexible substantially planar member 104. In further embodiments, a second collection device 118 can be coupled with only select portions of an edge of a substantially planar member 104, such that it can hang freely from a substantially planar member 104 in some areas. Similar to a first collection device 116 described above, a second collection device 118 can have an "open-top" trough configuration, with said "open top" adjacent to a longitudinal edge of a substantially planar member 104. In such embodiments a second collection device 118 can have a substantially V-shaped lateral cross-sectional geometry. However, in other embodiments, a second collection device 118 can have a rounded, rectangular, U-shaped, or any other known and/or convenient geometry, with any desired cross-sectional geometry. In yet further embodiments, a second collection device 118 can have one or more apertures along its length such that accumulated water can be funneled down onto the ground or into a tube, container, or any other desired device. A second collection device 118 can be fabricated from metal, plastic, treated wood, or any other known and/or convenient material upon which water can freely slide under the influence of gravity. Moreover, the material comprising a second collection device 118 can have corrosion-resistant, anti-mold, anti-fungal, and/or ultraviolet-protective properties and/or coatings. In yet further embodiments, the material comprising a second collection device 118 can be adapted to withstand extremely high or low temperatures without excessive wear, breakage, or warping.

In some embodiments, at least one tube 120 can be coupled with the end of a second collection device 118 and the coincident lower lateral edge of a substantially planar member 104. A tube 120 can also be coupled with at least one elongated support member 108, either along its surface or through an aperture in its surface. In the embodiment depicted in FIG. 1A, a tube 120 can transfer water to the hollow interior of an elongated support member 108 for subsequent transfer to a storage vessel 122. A tube 120 can be coupled with a substantially planar member 104, a frame member 106, an elongated support member 108, and/or a storage vessel 122 via adhesive, friction fit, tubular joint components, screws, nuts, brackets, pins, thermal bonding, and/or any other known and/or convenient method of coupling.

A tube 120 can be flexible, semi-rigid, or rigid, and can be comprised of nylon, polymer, metal, wood, plastic, and/or any other desired material upon which water can freely slide under the influence of gravity. Moreover, the material comprising a tube 120 can have corrosion-resistant, anti-mold, anti-fungal, and/or ultraviolet-protective properties and/or coatings. In yet further embodiments, the material comprising a tube 120 can be adapted to withstand extremely high or low temperatures without excessive wear, breakage, or warping. The collection apparatus 102 depicted in FIG. 1A comprises one tube 120, however in alternate embodiments a collection apparatus 102 can have two or more tubes 120. In still other embodiments, a collection apparatus 102 may be devoid of any tubes 120.

Figure 1E:
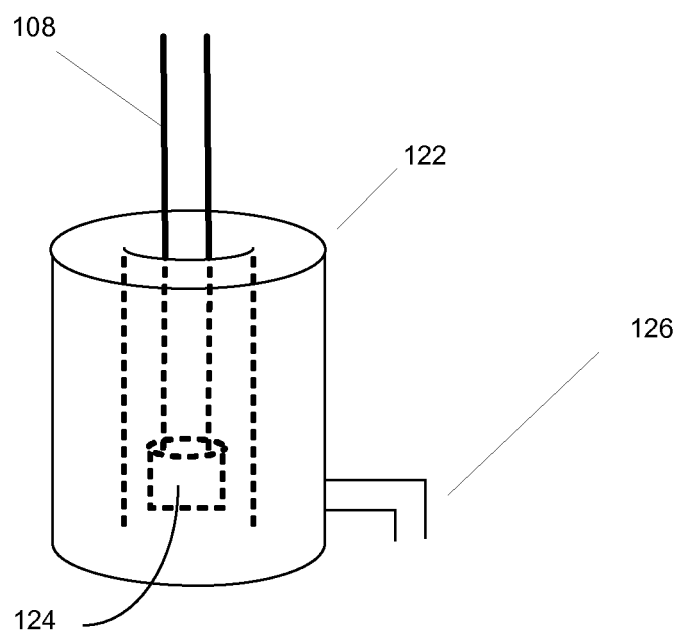
FIG. 1E depicts a side view of the interior of a storage unit in the present device.

As shown in the embodiment in FIGS. 1A and 1E, the proximal end of at least one elongated support member 108 can be coupled with the interior base of at least one storage vessel 122 via a coupling member 124. In some embodiments, a storage vessel 122 can have a substantially cylindrical geometry, but in other embodiments a storage vessel 122 can be cubed or can have any other known and/or convenient geometry. A storage vessel 122 can be comprised of metal, plastic, or any other desired material, and can be above-ground or below-ground. In some embodiments and as shown in FIG. 1E, an elongated support member 108 and a coupling member 124 can be positioned substantially in the center of the base of a storage vessel 122, but in other embodiments can be located at any other known and/or convenient position in the interior of a storage vessel 122. In further embodiments, an elongated support member 108 can be coupled with the exterior opening of a storage vessel 122. A storage vessel 122 can be adapted to hold a desired amount of collected atmospheric moisture for a desired period of time, but in other embodiments the contents of a storage vessel 122 can be immediately transferred to another desired location or into the ground for watering vegetation.

In some embodiments, a coupling member 124 can be a clamp, but in other embodiments can be a friction-fit coupling or any other known and/or convenient device or method of coupling. Furthermore, in some embodiments, a storage vessel 122 can further comprise a selectively controllable valve system 126 that can be controlled via automation or manual controls. By incorporating at least one valve system 126 into a collection apparatus 102, accumulated water can be diverted to irrigation apparatuses, additional storage tanks, home or industrial filtration systems, misters coupled with the apparatus 102, and/or any other desired location.

In further embodiments, a collection apparatus 102 can further comprise one or more energy capture devices 128, each of which can comprise (but is not limited to) one or more of the following: photovoltaic elements, thermovoltaic elements (Seebeck effect), Thermoelectric Generators (TEG-Peltier effect), piezoelectric components, triboelectric components, electro-dynamic generators (dynamos), inductive generators and/or any known, convenient and/or discovered method and/or apparatus for capturing energy. An energy capture device 128 can be a part of or integrated with one or more existing components of an apparatus 102, or can be a separate device 128. In operation, energy can be transferred to an inverter, transformer, capacitor, battery and/or any other known, convenient and/or desirable energy storage or conversion apparatus by electric wiring, optical tubes or any other known and/or convenient apparatus or method for energy transport. In some embodiments, energy can be used locally, stored and/or delivered to an energy grid. Captured energy can be used to power irrigation systems or other farm or agricultural devices, transmitted for home use, utilized in security lighting and systems, and/or used for any other desired purpose and in conjunction with any other device required for energy transfer and usage.

Figure 1F:
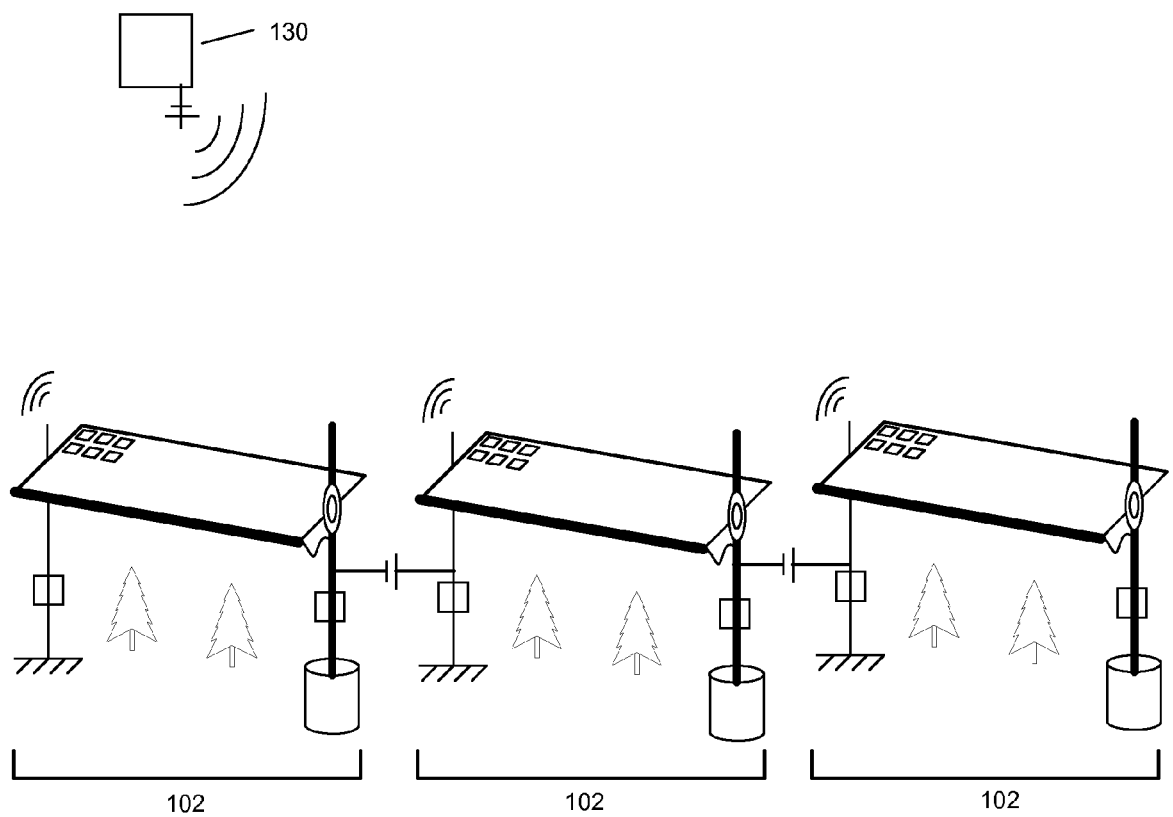
FIG. 1F depicts a plurality of condensate collection apparatuses coupled with each other, and a remote device.

Referring to FIG. 1F, in some embodiments multiple collection apparatuses 102 can be utilized in an area. In some instances apparatuses 102 can be coupled with each other for increased structural integrity. In other instances apparatuses 102 can have pivot mechanisms 110 and/or control mechanisms 114 coupled with each other and controlled by a remote device 130 either wirelessly or in a wired fashion. In such embodiments, a remote device 130 can control the spatial configuration of a substantially planar member 104, frame member 106, and/or elongated support members 108 individually or in concert, and/or a remote device 130 can control valves 126 and/or energy capture devices 128.

In use, the present device can be installed over an area such that a substantially planar member 104 can extend over said area. In the embodiment depicted in FIG. 1A, a gradient can be created by raising or lowering elongated support members 108 via at least one control mechanism 114, and/or manually or electronically controlling a pivot mechanism 110 and/or a pivot motor 112 to tilt a substantially planar member 104 and/or a frame member 106. Ambient water vapor rising from plants or the ground can condense along the surface of a substantially planar member 104. These condensed droplets can travel down the surface via gravity to a first collection device 116 and/or a second collection device 118, and then continue travelling to the end of collection members 116 118 that can be adjacent to one end of a flexible tube 120.

Water droplets can then transfer to the surface (interior or exterior) of an elongated support member 108 via a tube 120 and continue down to the proximal end of an elongated support member 108, where they can be collected in a storage vessel 122. However, in alternate embodiments, surface-mounted transfer channels and/or tubes can be selectively coupled with the support member 108 to transfer water droplets to a desired location.

Figure 2:
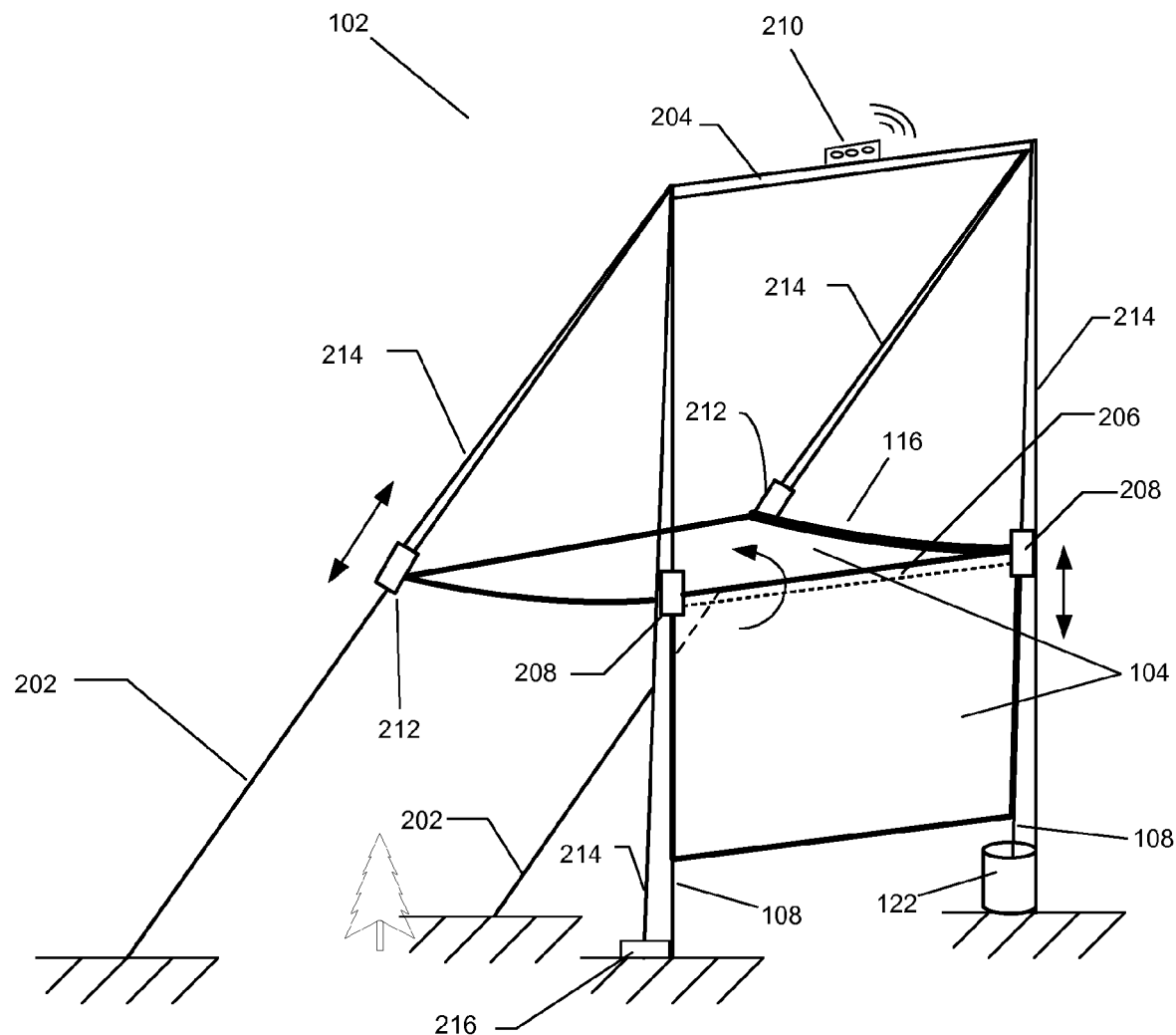
FIG. 2 depicts an alternate embodiment of a vapor recover system.

FIG. 2 depicts an alternate embodiment of a collection apparatus 102. In the embodiment depicted in FIG. 2, the collection apparatus 102 comprises a substantially planar member 104, elongated support members 108, brace members 202, a lateral support member 204, a cross bar member 206, cross bar cross bar attachment elements 208, brace attachment elements 212, control cords 214 and a cord anchor 216.

In the embodiment depicted in FIG. 2, the proximal ends of two or more elongated support members 108 can be fixed and/or semi-permanently fixed relative to the ground, and the distal end of each elongated support member 108 can be coupled with the distal end of a brace member 202. Each brace member 202 can be fixed and/or semi-permanently fixed relative to the ground or a mobile device or apparatus. As depicted, brace members 202 can have a substantially angled configuration relative to elongated support members 108 and the surface to which they are attached. In some embodiments, the elongated support members 108 and/or the brace members 202 can be comprised of metal, wood, plastic, or any other known and/or convenient material or combination of materials. In further embodiments, elongated support members 108 and/or brace members 202 can have corrosion-resistant, anti-mold, anti-fungal, and/or ultraviolet-protective properties and/or coatings. In yet additional embodiments, the material comprising elongated support members 108 and/or brace members 202 can be adapted to withstand extremely high or low temperatures without excessive wear, breakage, or warping. Moreover, as described above with respect to elongated support members 108 in FIG. 1A, one or more elongated support members 108 can be adapted to be selectively raised or lowered, either manually or in an automated fashion.

In some embodiments, a collection apparatus 102 can include at least one lateral support member 204 that extends between the distal ends of elongated support members 108. In other embodiments, a lateral support member 204 can fully encompass the perimeter edges of a substantially planar member 104, similar to the frame member 106 previously described. However, in alternate embodiments the lateral support member 204 may be absent. A lateral support member 204 can be comprised of metal, wood, plastic, or any other known and/or convenient material or combination of materials. In further embodiments, a lateral support member 204 can have corrosion-resistant, anti-mold, anti-fungal, and/or ultraviolet-protective properties and/or coatings. In yet additional embodiments, the material comprising a lateral support member 204 can be adapted to withstand extremely high or low temperatures without excessive wear, breakage, or warping.

In the embodiment depicted in FIG. 2, a collection apparatus 102 comprises at least one cross bar member 206. A cross bar member 206 can have a substantially horizontal configuration and can be coupled with elongated support members 108 via cross bar attachment elements 208. The ends of a cross bar member 206 can be coupled with elongated support members 108 proximate to the midpoint along the length of each elongated support member. In some embodiments, cross bar attachment elements 208 can be configured to and/or adapted to be selectively positioned at any position along the length of the elongated support members 108, thus allowing the cross bar member 206 to be selectively positioned at any horizontal position relative to the elongated support members 108. In other embodiments, cross bar attachment elements 208 can be coupled with a substantially planar member 104, thereby allowing a substantially planar member 104 to be spatially manipulated. In some embodiments the cross bar attachment elements 208 can comprise screws, pins, and/or fasteners to selectively position the cross bar attachment elements 208 relative to the elongated support members 108. However in alternate embodiments, any known and/or convenient fastener and/or attachment mechanism can be used to couple a cross bar member 206 with elongated support members 108 either fixedly or temporarily.

A substantially planar member 104 (details of which are described above with respect to FIG. 1A) can be coupled with brace attachment elements 212. In some embodiments, brace attachment elements 212 can be configured to and/or adapted to be selectively positioned at any position along the length of brace members 202, thus allowing the substantially planar member 104 to be selectively positioned at any desired location along the length of brace members 202. In some embodiments the brace attachment elements 212 can comprise screws, pins, and/or fasteners to selectively position the brace attachment elements 212 relative to the brace members 202, thus enabling desired positioning of a substantially planar member 104. However in alternate embodiments, any known and/or convenient fastener and/or attachment mechanism can be used to couple a brace attachment element 212 with a brace element 202 either fixedly or temporarily.

In the embodiment depicted, cross bar attachment elements 208 can be selectively positioned along the length of elongated support members 108, and brace attachment elements 212 can be selectively positioned along the length of the brace elements 202. In some embodiments the position of cross bar attachment elements 208 and/or brace attachment elements 212 can be controlled via control cords 214. A control cord 214 can be coupled with a brace attachment element 212, can travel along the length of a brace member 202, then along the length of an elongated support member 108, and finally can be selectively coupled with a cord anchor 216 located proximate to the proximal end of an elongated support member 108.

In embodiments where a substantially planar member 104 is coupled with cross bar attachment elements 208 and brace attachment elements 212 that can be selectively moved along the lengths of elongated support members 108 and brace elements 202, respectively, the substantially planar member 104 can be selectively manipulated into any desired position. A substantially planar member 104 can be coupled with cross bar attachment elements 208 and/or brace attachment elements 212 via screws, hooks, threading, thermal bonding, hook and loop, and/or any other desired device or manner of coupling. In some embodiments, a substantially planar member 104 can be detachable from an apparatus 102 for replacement or washing. In some configurations of the embodiment depicted in FIG. 2, the substantially planar member 104 can be configured to be in a completely vertical configuration and/or be configured to be in contact with the ground.

A collection apparatus 102 can further comprise a first collection device 116 and a storage vessel 122, both described in detail above with respect to FIG. 1A, for collecting and storing vapor condensate. Some embodiments can further comprise additional collection devices and storage vessels as needed. Moreover, the embodiment depicted in FIG. 2 can further comprise control mechanisms 114 for raising and lowering elongated support members 108 (described and illustrated above with respect to FIG. 1A). The collection apparatus 102 of FIG. 2 can even further comprise one or more energy capture devices 128 and/or a remote device 130.

In operation, a user can selectively position a cross bar member 206 relative to elongated support members 108. A user can then use control cords 214 to selectively control the angle of the substantially planar member 104 relative to the ground and then fix such angle via the cord anchor 216. Thus in operation the substantially planar member 104 can have a substantially vertical portion and an angled portion which hangs over and/or is rotated about the cross bar member 206. Moreover, if desired in some embodiments a cross bar member 206 can be adapted to selectively detach from cross bar attachment elements 208 and/or elongated support members 108, thereby allowing a substantially planar member 104 to fall proximate to the ground. In such embodiments a substantially planar member 104 can be used as ground cover or in lieu of mulch to prevent soil moisture loss and protect vegetation from the elements.

In some embodiments a cord anchor 216 can include a winch system to mechanically control the brace attachment elements 212 thus controlling the angle of the substantially planar member 104 relative to the ground. In some embodiments the device can further comprise a computerized control system 210 adapted to selectively receive environmental information and selectively control the relative positions of the cross bar attachment elements 208 and/or brace attachment elements 212 and/or the substantially planar member 104. In some embodiments the environmental information can include relative humidity, sun position, UV intensity, wind speed, and/or any known and/or convenient and/or desired environmental information.

Figure 3A:
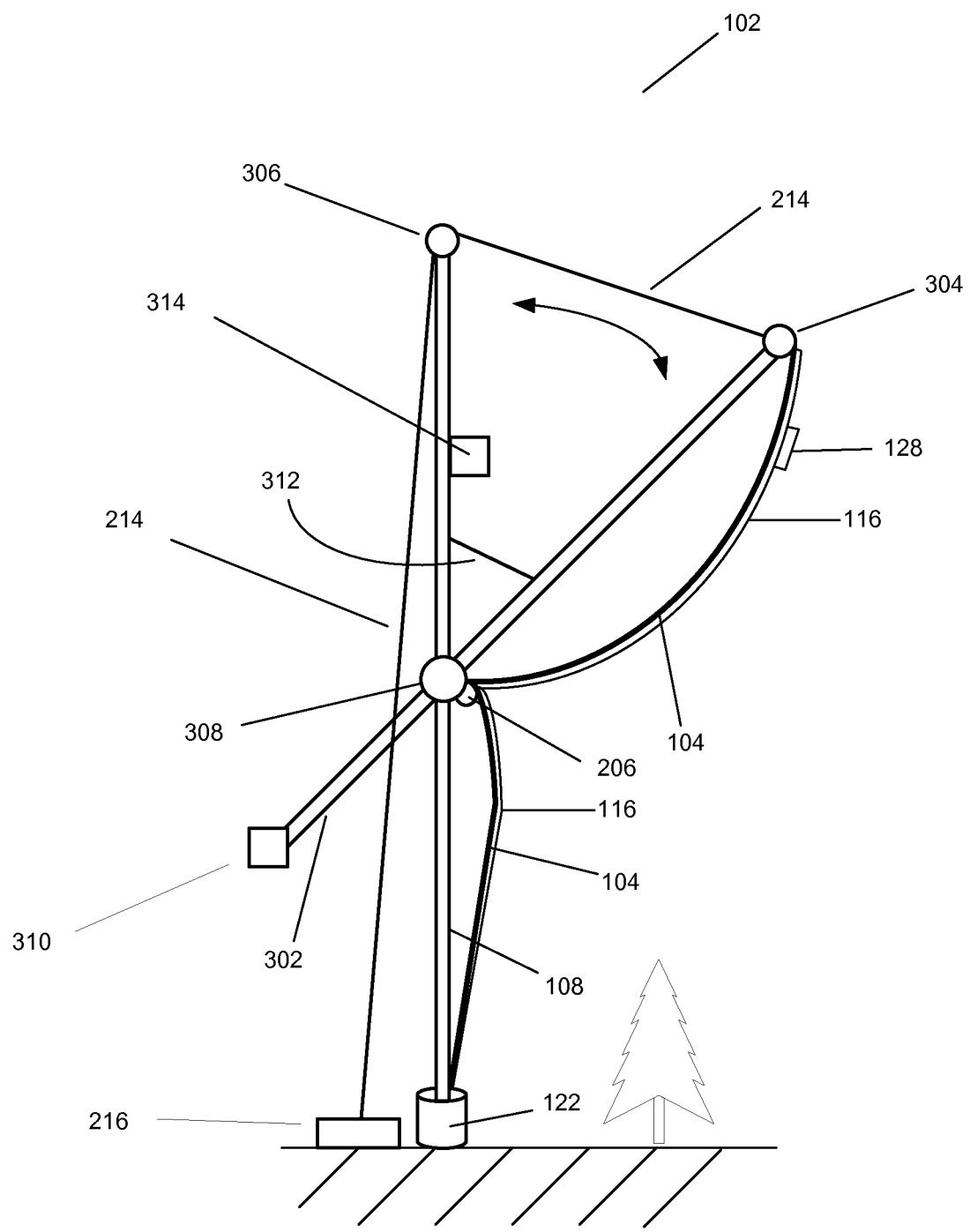
FIGS. 3A-3B depict a further alternate embodiment of the vapor recover system.
Figure 3B:
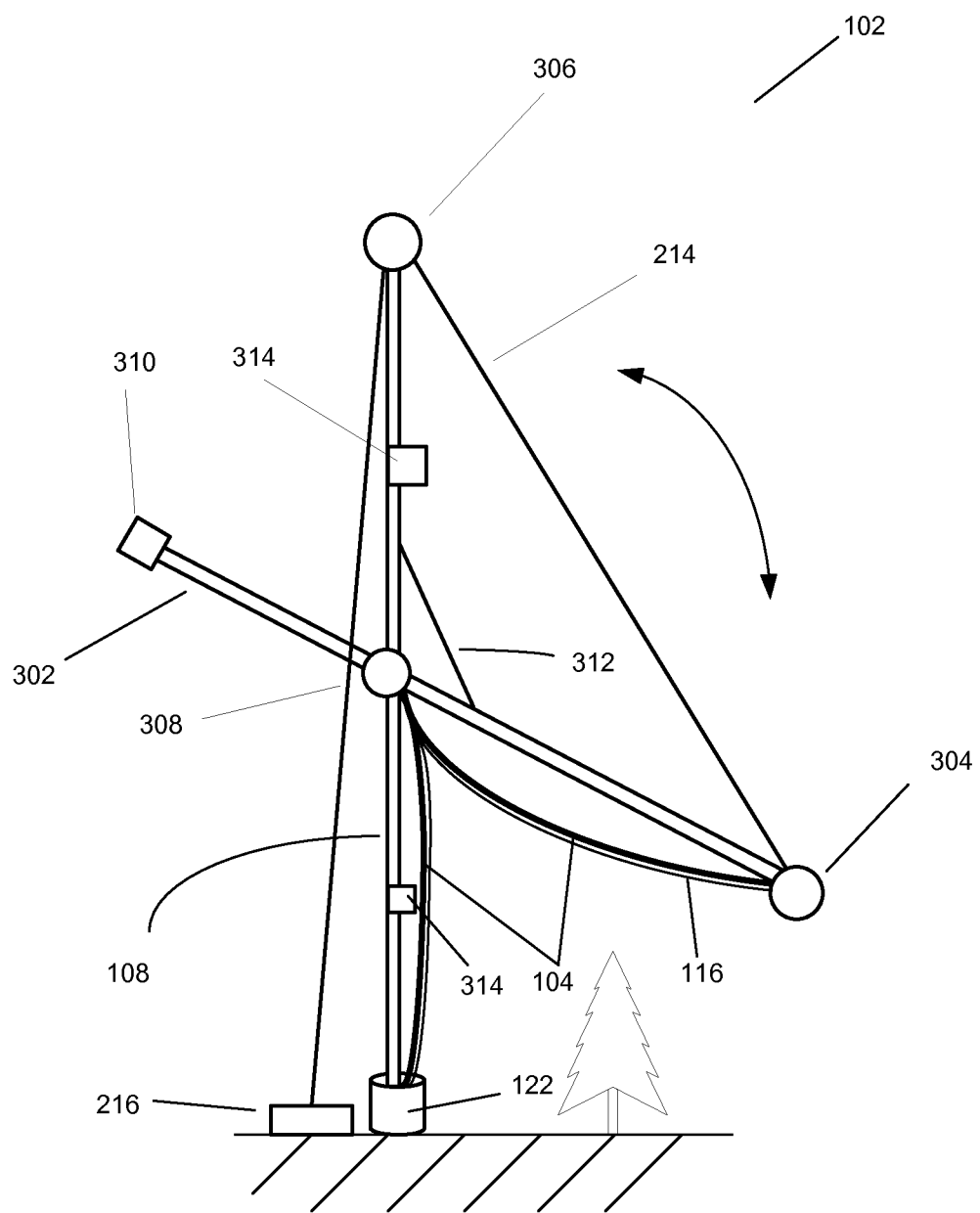

FIGS. 3A-3B depict a further alternate embodiment of a vapor condensate collection apparatus 102. In the embodiment depicted, the apparatus 102 can include an elongated support member 108, a substantially planar member 104, a control cord 214, a cord anchor 216 and an angle control member 302.

In the embodiment depicted in FIGS. 3A and 3B, a substantially planar member 104 can be selectively coupled with the distal end of the angle control member 302. A substantially planar member 104 can in some embodiments pass over or be coupled with a cross bar member 206 coupled adjacent an elongated support member 108, and then the substantially planar member 104 can cascade to the ground. In some embodiments, the base of the substantially planar member 104 can be selectively coupled with the proximal end of the elongated support member 108 and/or selectively coupled along the length of the elongated support member 108 from the base of the elongated support member 108 to the cross bar member 206.

An angle control member 302 can be an elongated rod or other member having any desired configuration and/or lateral cross-sectional geometry. In some embodiments, an angle control member 302 can be rigid and comprised of metal, while in other embodiments an angle control member 302 can be flexible and can be comprised of any other desired material or combination of materials. In the embodiment depicted in FIGS. 3A-3B, the distal end of an angle control member 302 can further comprise a weighted member 304 to aid in controlling the positioning of an angle control member 302 and a substantially planar member 104. A weighted member 304 can be a solid metal sphere, piece of wood, container filled with water, beads, or other desired substance, and/or any other desired device for adding appropriate weight to the apparatus 102. However, in other embodiments a weighted member 304 need not be present.

As depicted in FIGS. 3A-3B, the distal end of an elongated support member 108 can be coupled with a cord guide 306. A cord guide 306 can be a pulley device, track, tubular member, or any other known and/or convenient device or mechanism for guiding control cords 214. In some embodiments, a cord guide 306 can be electronically and/or remotely controlled. In other embodiments, a cord guide 306 can assist a user in manual manipulation of control cords 214. In yet further embodiments, an apparatus 102 can comprise two or more cord guides 306. A cord guide 306 can be comprised of metal, wood, plastic, polymer, or any other material and/or combination of materials. Furthermore, a cord guide 306 can be cylindrical, spherical, or can have any other desired geometry.

The angle of the angle control member 302 can be selected via angle control element 308. In some embodiments angle control element 308 can be selectively positioned along the length of elongated support member 108. In some embodiments an angle control member 302 can extend beyond the plane established by elongated support member 108 and further comprise a counterbalance 310 adapted and/or configured to offset the weight of the portion of the angle control member 302 extending away from elongated support member 108 and/or the weight of substantially planar member 104. A counterbalance 310 can be a solid metal object, a piece of wood, a container filled with water, beads, or other desired substance, and/or any other desired device for adding appropriate weight to the apparatus 102. However in alternate embodiments a counterbalance 310 need not be present.

In some embodiments an angle control element 308 can be manually controlled and/or can be controlled via a motor or other mechanical apparatus. An angle control element 308 can be a rod, I-bolt, or any other device or combination of components that can allow rotation of an angle control member 302 about an axis perpendicular to and coincident with an elongated support member 108. An angle control element 308 can be comprised of metal, wood, plastic, or any other desired material or combination of materials.

In still further alternate embodiments, the device can further comprise a support element 312 that can be selectively coupled with both the elongated support member 108 and the angle control member 302 to temporarily fix the angle of the angle control member 302 relative to the elongated support member 108. Such temporary fixation can be accomplished via any known and or convenient mechanism including, but not limited to, fasteners, snaps, hook-loop fastener, and/or any known and/or convenient mechanism. Furthermore a support member 312 can be comprised of rigid or flexible material, and can be comprised of silicone, fabric, wood, nylon, or any other known and/or convenient material or combination of materials. In some embodiments the support member 312 can be absent.

In still further alternate embodiments the device can further comprise drip and/or mist heads 314. Drip and/or mist heads 314 can be adapted to collect and utilize rain water and/or vapor condensate from various parts of an apparatus 102. In other embodiments, moisture collected in a storage vessel 122 can be transported to drip and/or mist heads 314 via tubing or any other desired device or mechanism.

In the embodiment depicted in FIG. 3A, a collection apparatus 102 further comprises a first collection device 116 coupled with an edge of a substantially planar member 104. As described above with respect to FIG. 1A, a first collection device 116 can catch accumulated moisture from vapor or precipitation draining from the surfaces of a substantially planar member 104, and then funnel the moisture down to a storage vessel 122. In other embodiments, an apparatus 102 can comprise two or more collection devices. In other embodiments, a collection device 116 can be absent, and condensate can simply be collected by running down the surfaces of a substantially planar member 104 and draining into a storage vessel 122.

In operation, a user can select the angle of the angle control member 302 relative to the elongated support member 108 and selectively fix such angle via the support member 312. In alternate embodiments fixation of the angle of the angle control member 302 relative to the elongated support member 108 can be controlled via angle control element 308. In some embodiments angle control element 308 can be computer-controlled and/or manually controlled. As previously described computer-controls can take into account various environmental factors and can automatically and selectively control the angle based upon the received environmental factor information.

In further alternate embodiments, flexible or rigid energy capturing elements 128 can be coupled with a substantially planar member 104, elongated support member 108, angle control member 302, and/or any other portion of a collection apparatus 102. In further alternate embodiments, the energy capturing elements can be attached to additional layers (not shown) of substantially planar members 104.

In operation, a user can select the angle of the angle control member 302 relative to the elongated support member 108 and selectively fix such angle via the support member 312. In alternate embodiments, fixation of the angle of the angle control member 302 relative to the elongated support member 108 can be controlled via angle control element 308. In some embodiments, angle control element 308 can be computer-controlled and/or manually controlled. As previously described computer-controlled embodiments can take into account various environmental factors and can automatically selectively control the angle, height of 104 and 210 layers based upon the received environmental factor information for partition and optimization of resource use for desired result(s).

In operation ambient moisture in the air can be collected on the substantially planar member 104 and delivered to a collection device 116 and/or contained within the elongated support member 108. The collected moisture can, in some embodiments, be redistributed via the drip and/or mist heads 314. A substantially planar member 104 can be selectively manipulated to have any desired configuration allowed by the elements described herein. A collection apparatus 102 can be used not only for vapor condensate collection, but also for ground shade and insulation, wind guarding, UV-protection, energy capture, and/or any other desired purpose.

Although the system and method has been described in conjunction with specific embodiments thereof, it is evident that many alternatives, modifications and variations will be apparent to those having ordinary skill in the art.

What is claimed is:

1. A vapor condensate collection apparatus, comprising:
   a substantially planar member having at least one perimeter edge and a vapor collection surface;
   a first collection device, said first collection device being an elongated member coupled with and running along at least a portion of said at least one perimeter edge of said substantially planar member;
   at least one elongated support member coupled with said substantially planar member; and
   at least one storage vessel coupled with said at least one elongated support member, wherein when said vapor collection surface is inclined relative to a horizontal plane, vapor condensate that forms on said vapor collection surface from moisture in the surrounding air travels via gravity along said vapor collection surface into said first collection device, along said first collection device, down said at least one elongated support member, and into said at least one storage vessel to form an accumulated vapor condensate in said at least one storage vessel.

2. The apparatus of claim 1, wherein said substantially planar member is comprised of material selected from the group consisting of: mesh, fabric, nylon, silicone, and polymer.

3. The apparatus of claim 1, further comprising a rigid frame member coupled with the perimeter edge of said substantially planar member, said frame member allowing said substantially planar member to be held in a desired spatial configuration and providing additional structural integrity.

4. The apparatus of claim 1, further comprising at least one pivot mechanism coupled with said substantially planar member and said at least one elongated support member, said at least one pivot mechanism allowing for selective rotation of said substantially planar member.

5. The apparatus of claim 1, wherein said at least one elongated support member comprises at least one adjustable portion that is movable relative to other portions of said at least one elongated support member, such that movement of said at least one adjustable portion changes the length of said at least one elongated support member and thereby adjusts the height of a point at which said substantially planar member is coupled with said elongated support member, and wherein at least one control mechanism coupled with said at least one elongated support member is configured to move said at least one adjustable portion.

6. The apparatus of claim 1, further comprising at least one energy-capture device coupled with said substantially planar member.

7. The apparatus of claim 1, wherein said storage vessel comprises a selectively controllable valve system that allows for said accumulated vapor condensate to be selectively diverted to one or more members of the group consisting of an irrigation apparatus, a water storage tank, a home filtration system, an industrial filtration system, and a mister.

8. The apparatus of claim 1, wherein said first collection device is an elongated member having an open-top trough configuration that at least partially hangs below said at least one perimeter edge of said substantially planar member.

9. The apparatus of claim 1, wherein:
said substantially planar member is comprised of flexible polymer mesh material,
said substantially planar member has rectangular geometry, with two longitudinal perimeter edges and two lateral perimeter edges,
said substantially planar member is coupled with one of said at least one elongated support member at a midpoint of each lateral perimeter edge,
each of said at least one elongated support members is oriented substantially vertically relative to a horizontal plane,
each said at least one elongated support member comprises at least one adjustable portion that is movable relative to other portions of said at least one elongated support member, such that movement of said at least one adjustable portion changes the length of said at least one elongated support member and thereby adjusts the height of a point at which said substantially planar member is coupled with said elongated support member, movement of said adjustable portion being controlled by a control mechanism comprising a locking mechanism configured to selectively hold said substantially planar member in a desired spatial orientation relative to said elongated support member,
said storage vessel comprises a selectively controllable valve system that allows for said accumulated vapor condensate to be selectively diverted to one or more members of the group consisting of an irrigation apparatus, a water storage tank, a home filtration system, an industrial filtration system, and a mister,
said first collection device is an elongated member having an open-top trough configuration, said first collection device being coupled with one of said two lateral perimeter edges of said substantially planar member,
said two longitudinal perimeter edges and said two lateral perimeter edges are coupled with a rigid frame member that allows said substantially planar member to be held in said desired spatial configuration and provides structural integrity,
each of said two lateral perimeter edges are coupled with one of said at least one elongated support members with a pivot mechanism configured to selectively rotate said substantially planar member,
a second collection device is coupled with a different one of said two longitudinal perimeter edges of said substantially planar member,
a flexible tube is coupled with ends of each of said first and second collection devices and at least one of said at least one elongated support member,
at least one energy-capture device is coupled with said substantially planar member, and
a remote device is configured to electronically and remotely control operation of said control mechanism, said pivot mechanism, and said selectively controllable valve system.

10. The apparatus of claim 1, further comprising:
at least one angle control member coupled with said at least one elongated support member via an angle control element, said at least one angle control member being an elongated member that is rotatable relative to said at least one elongated support member about said angle control element;
at least one control cord coupled with said at least one elongated support member and a first end of said angle control member; and
a cord guide coupled with a first end of said at least one elongated support member, said cord guide allowing for controlled and precise movement of said at least one control cord, such that movement of said at least one control cord causes movement of said at least one elongated support member.

11. The apparatus of claim 10, further comprising:
a counterbalance coupled with a second end of said angle control member; and
a weighted member coupled with said first end of said angle control member.

12. A vapor condensate collection apparatus, comprising:
at least two elongated support members having a substantially vertical configuration and being separated by a distance;
at least one lateral support member having a substantially horizontal configuration, the ends of said at least one lateral support member being coupled with ends of said at least two elongated support members;
at least one cross bar member having a substantially horizontal configuration, the ends of said at least one cross bar member being coupled with said at least two elongated support members at a point along the length of each of said at least two elongated support members;
at least two brace members each having a first end coupled with an end of one of said at least two elongated support members and a second end coupled with a ground surface, each of said at least two brace members having substantially angled configurations relative to one of said at least two elongated support members and said ground surface;
at least one substantially planar member being coupled with said at least two elongated support members and said at least two brace members, said substantially planar member having a vapor collection surface;
at least one control cord coupled with said at least two elongated support members and said at least two brace members; and
at least one storage vessel coupled with an end of one of said at least two elongated support members,
wherein when said vapor collection surface is inclined relative to a horizontal plane, vapor condensate that forms on said vapor collection surface from moisture in the surrounding air travels via gravity along said vapor collection surface and to at least one of said at least two elongated support members, and then into said at least one storage vessel to form an accumulated vapor condensate in said at least one storage vessel.

13. The apparatus of claim 12, further comprising at least one collection device coupled with at least one edge of said substantially planar member.

14. The apparatus of claim 12, wherein said at least one cord control can be manipulated to adjust the spatial configuration of said substantially planar member.

15. The apparatus of claim 12, wherein said substantially planar member and said at least one cross bar member are coupled with said at least two elongated support members via at least two cross bar attachment elements, and said substantially planar member is further coupled with said at least two brace members via at least two brace attachment elements.

16. The apparatus of claim 15, further comprising a computerized control system that can selectively receive environmental information and selectively control the relative positions of said substantially planar member, said at least one cross bar member, said at least two cross bar attachment elements, and said at least two brace attachment elements.

17. The apparatus of claim 1, wherein said substantially planar member is coupled with said at least one elongated support member with a slideable bracket that is configured to selectively lock into position at a plurality of points along the length of said at least one elongated support member, such that movement of said slideable bracket adjusts the height of a point at which said substantially planar member is coupled with said elongated support member.

18. A vapor condensate and energy collection system, comprising:
- a plurality of vapor condensate collection apparatuses coupled with each other; and
- a remote device that can selectively control operation of each of said plurality of vapor condensate collection apparatuses, wherein each vapor condensate collection apparatus in said plurality of vapor condensate collection apparatuses comprises a substantially planar member having at least one perimeter edge and a vapor collection surface, at least one collection device coupled with at least a portion of said at least one perimeter edge of said substantially planar member, and at least one elongated support member coupled with said substantially planar member, wherein said plurality of vapor condensate collection apparatuses is coupled with at least one storage vessel, and wherein when the vapor collection surface of one or more of said plurality of vapor condensate collection apparatuses is inclined relative to a horizontal plane, vapor condensate that forms on that vapor collection surface from moisture in the surrounding air travels via gravity along the vapor collection surface into said at least one collection device of the vapor condensate collection apparatus, down said at least one elongated support member, and into said at least one storage vessel to form an accumulated vapor condensate in said at least one storage vessel.

* * * * *